(12) United States Patent
Gregerson

(10) Patent No.: US 8,113,431 B2
(45) Date of Patent: Feb. 14, 2012

(54) SCALE ASSEMBLY MOUNTING APPARATUS FOR AN OPTICAL SCANNER

(75) Inventor: David L. Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 916 days.

(21) Appl. No.: 12/116,740

(22) Filed: May 7, 2008

(65) Prior Publication Data

US 2009/0194595 A1    Aug. 6, 2009

Related U.S. Application Data

(60) Provisional application No. 61/026,494, filed on Feb. 6, 2008.

(51) Int. Cl.
*G06K 7/10*      (2006.01)

(52) U.S. Cl. ............... 235/462.43; 235/462.13; 235/383

(58) Field of Classification Search ............. 235/462.43, 235/462.13, 462.14, 383
See application file for complete search history.

(56) References Cited

U.S. PATENT DOCUMENTS

| | | | | |
|---|---|---|---|---|
| 5,086,879 A * | 2/1992 | Latimer et al. | ................... | 186/61 |
| 5,139,100 A * | 8/1992 | Brauneis | .................... | 177/25.15 |
| 6,092,726 A * | 7/2000 | Toussant et al. | .............. | 235/383 |
| 6,237,852 B1 * | 5/2001 | Svetal et al. | ............. | 235/462.43 |
| 6,830,186 B1 * | 12/2004 | Nahar | ....................... | 235/462.14 |
| 2006/0131416 A1 * | 6/2006 | Jwo | ................................ | 235/454 |
| 2006/0208894 A1 * | 9/2006 | Friend et al. | ............... | 340/572.3 |
| 2007/0063045 A1 * | 3/2007 | Acosta et al. | ............ | 235/462.13 |

* cited by examiner

*Primary Examiner* — Ahshik Kim
(74) *Attorney, Agent, or Firm* — Paul W. Martin

(57) ABSTRACT

A scale assembly mounting apparatus for an optical scanner which suspends a scale assembly above a mirror housing of the scanner. The apparatus includes a top surface which surrounds an aperture of a mirror housing of the scanner on at least three sides, and a bottom surface including a load cell assembly mounting structure for suspending a load cell assembly between the bottom surface and the mirror housing.

12 Claims, 5 Drawing Sheets

SCALE ASSEMBLY MOUNTING APPARATUS FOR AN OPTICAL SCANNER

CROSS-REFERENCE TO RELATED APPLICATION

The present application claims the benefit of the filing date of Provisional Application Ser. No. 61/026,494, filed Feb. 6, 2008.

BACKGROUND

Conventional optical barcode scanners typically include a mirrored spinner and pattern mirrors that together optically cooperate to generate a scan pattern. This type of scanner may or may not include a scale assembly. Scanners sold without scales must bear the cost of scale mounting hardware within the scanners. The inclusion of scale mounting hardware may complicate servicing of the scanners or complicate mounting of additional equipment within the scanners, such as an electronic article surveillance system.

It would be desirable to provide a scale assembly mounting apparatus for an optical scanner that avoids placing scale assembly components under mirror baskets.

SUMMARY

A scale assembly mounting apparatus for an optical scanner is provided.

The apparatus includes a top surface which surrounds an aperture of a mirror housing of the scanner on at least three sides, and a bottom surface including a load cell assembly mounting structure for suspending a load cell assembly between the bottom surface and the mirror housing.

DETAILED DESCRIPTION

Figure 1:
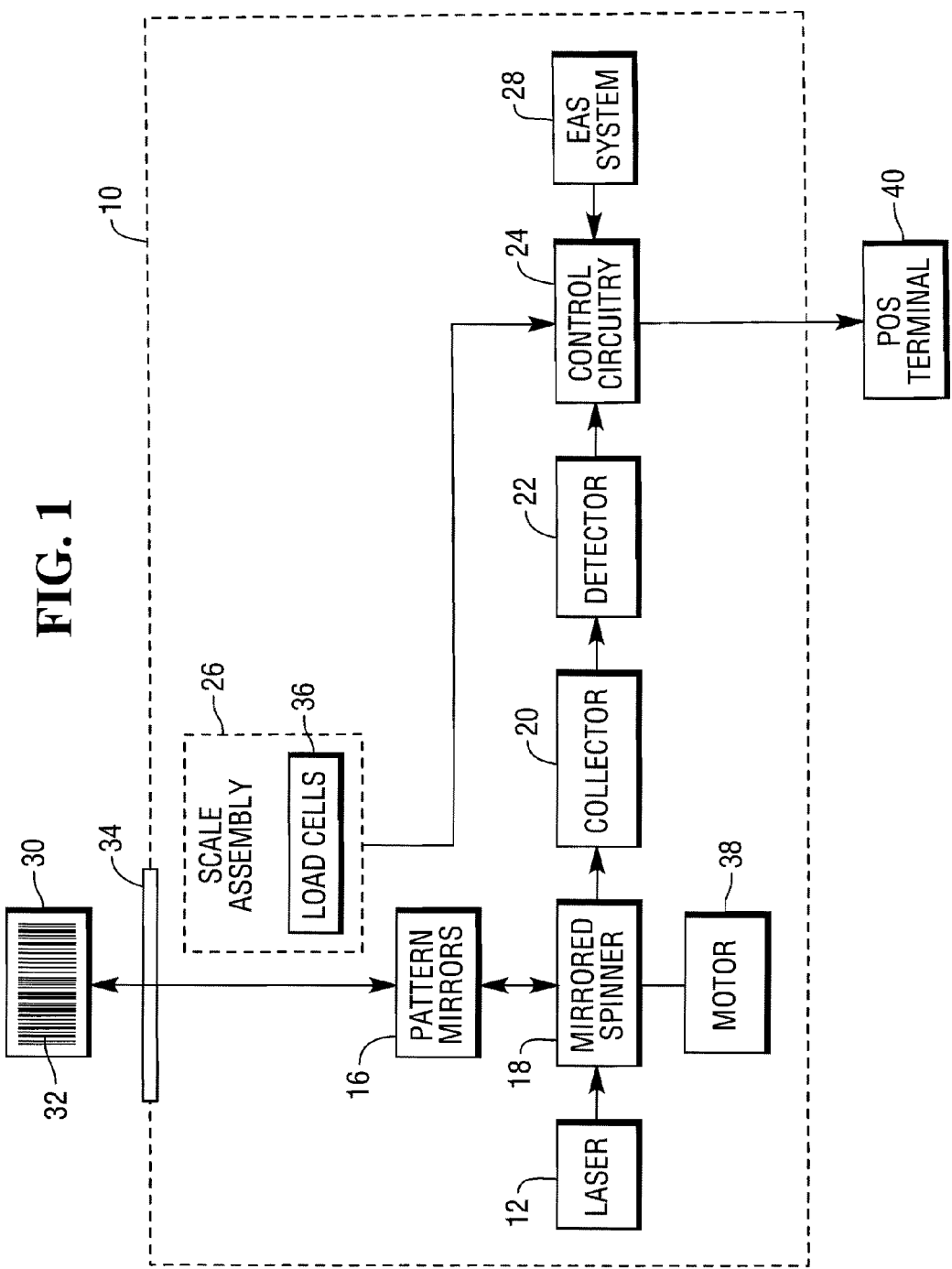
FIG. 1 is a block diagram of an example barcode scanner.
Figure 2:
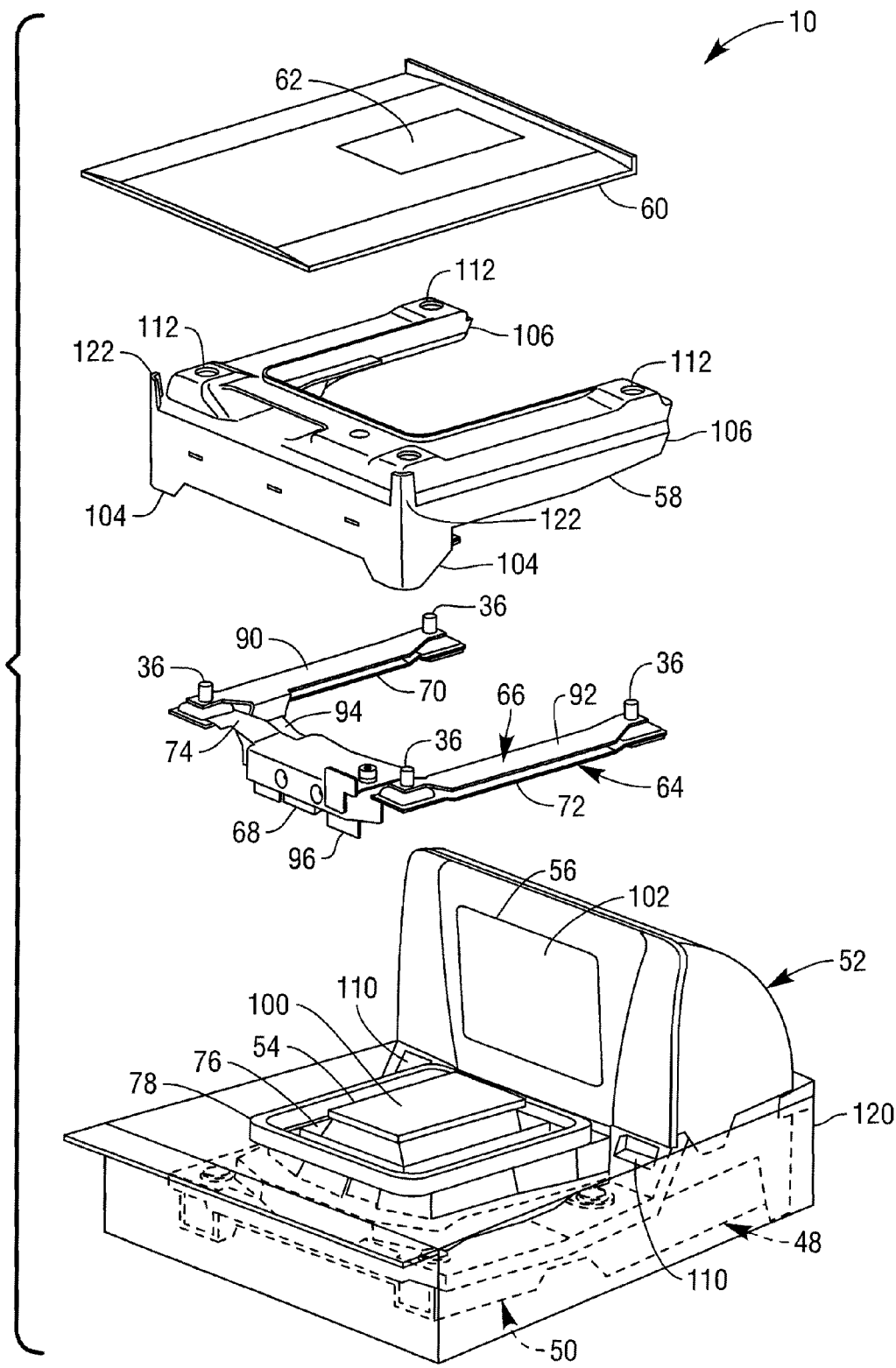
FIG. 2 is an exploded view of the example barcode scanner of FIG. 2.

With reference to FIG. 1, an example embodiment of optical barcode scanner 10 includes laser 12, mirrored spinner 18, pattern mirrors 16, collector 20, detector 22, and control circuitry 24. Scanner 10 also includes scale assembly 26 and may additionally include an electronic article surveillance (EAS) system 28.

Laser 12 produces a laser beam.

Mirrored spinner 18 directs the laser beam to pattern mirrors 16 to produce a scan pattern, and receives reflected light from item 30 from pattern mirrors 16. Mirrored spinner 18 is rotated by motor 38

Pattern mirrors 16 direct the laser beam through window 34 towards bar code label 32 and direct the reflected light to mirrored spinner 18.

Collector 20 collects the reflected light from mirrored spinner 18 and directs it towards detector 22.

Detector 22 converts the reflected light into electrical signals.

Control circuitry 24 controls operation of scanner 10 and additionally processes the electrical signals to obtain information encoded in bar code label 32. Control circuitry 24 sends the information to point-of-sale (POS) terminal 40.

In an alternate embodiment, scanner 10 may include two or more windows 34, and correspondingly may include additional lasers 12, mirrored spinners 18, sets of pattern mirrors 16, collectors 20, detectors 22, and control circuitries 24 for scanning item 30 from additional directions.

Scale assembly 26 includes load cells 36, which may include planar beam load cells manufacturer by Flintec, Inc.

EAS system 28 detects and deactivates product security labels on items 30. EAS system 28 may be manufactured by Sensormatic, Inc.

With reference to FIGS. 2-5, an example embodiment of scanner 10 is illustrated in more detail. In this example embodiment, scanner 10 includes a dual-aperture scanner 10.

Scanner 10 includes a housing 48 including a first housing portion 50 and a second housing portion 52. First housing portion 50 includes substantially horizontal aperture 54, including window 100 for scanning item 30 from a first set of directions. First housing portion 50 includes a first set of pattern mirrors 16.

Second housing portion 52 includes substantially vertical aperture 56, including window 102 for scanning item 30 from a second set of directions. Second housing portion 50 includes a second set of pattern mirrors 16.

Second housing portion 52 includes top piece 58. Top piece has a top surface and side surfaces to complete the upper part of second housing portion. Top piece 58 is generally U-shaped to fit around aperture 54 on at least three sides and is easily removable from first housing portion 50. For other scanners, top piece 58 may surround aperture 54 on all four sides.

Figure 5:
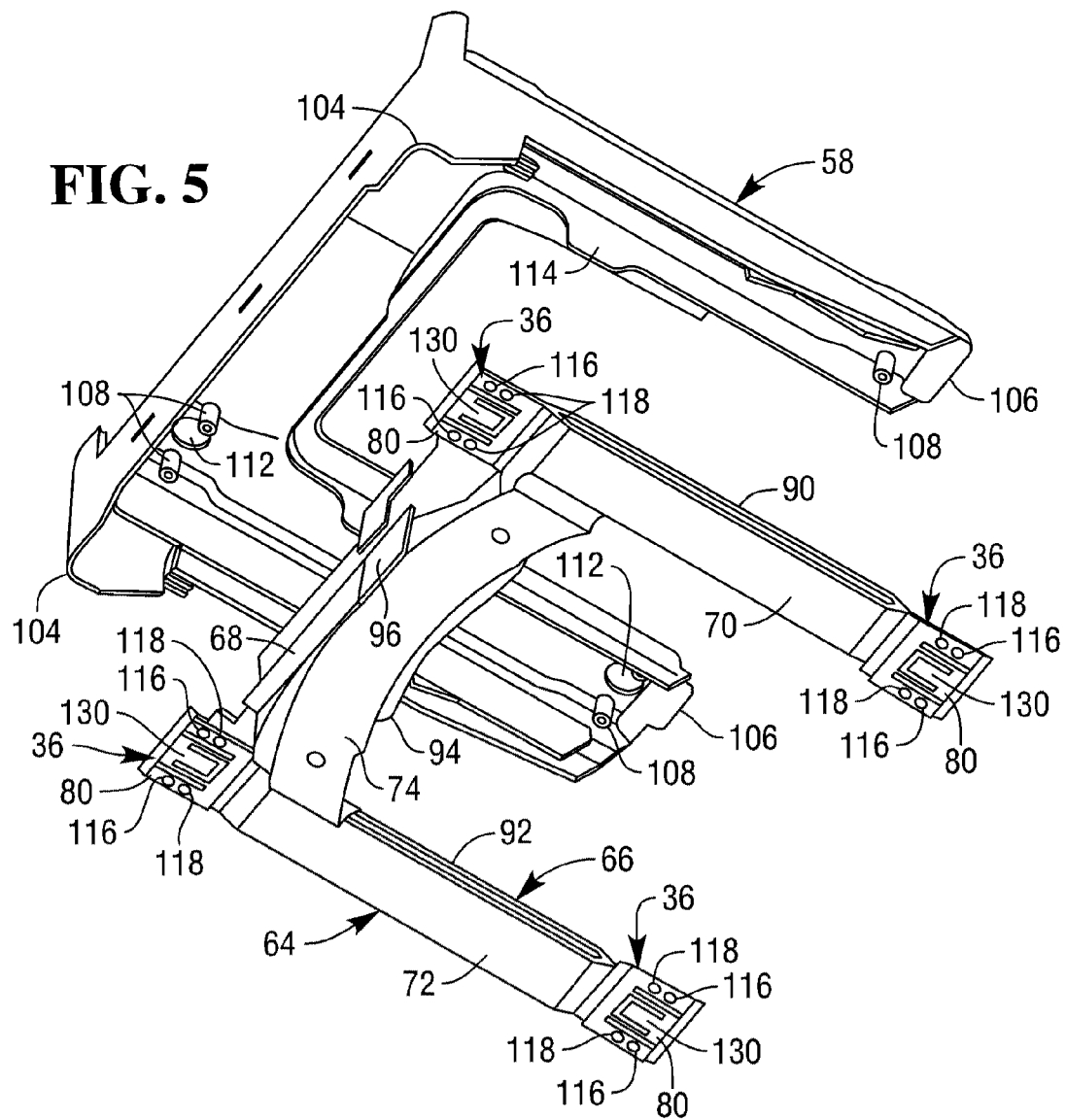
FIG. 5 is a perspective view illustrating an bottom surface of a scanner housing top piece.

Scale assembly 26 is located within first housing portion 50. Scale assembly 26 is mounted to the bottom surface of top piece 58 (FIG. 5).

In addition to load cells 36, scale assembly 26 includes weigh plate 60. Weigh plate 60 rests upon load cells 36 and includes window 62. Scale assembly 26 further includes load cell support member 64, load cell floating frame 66, and load cell electrical circuitry 68.

Figure 4:
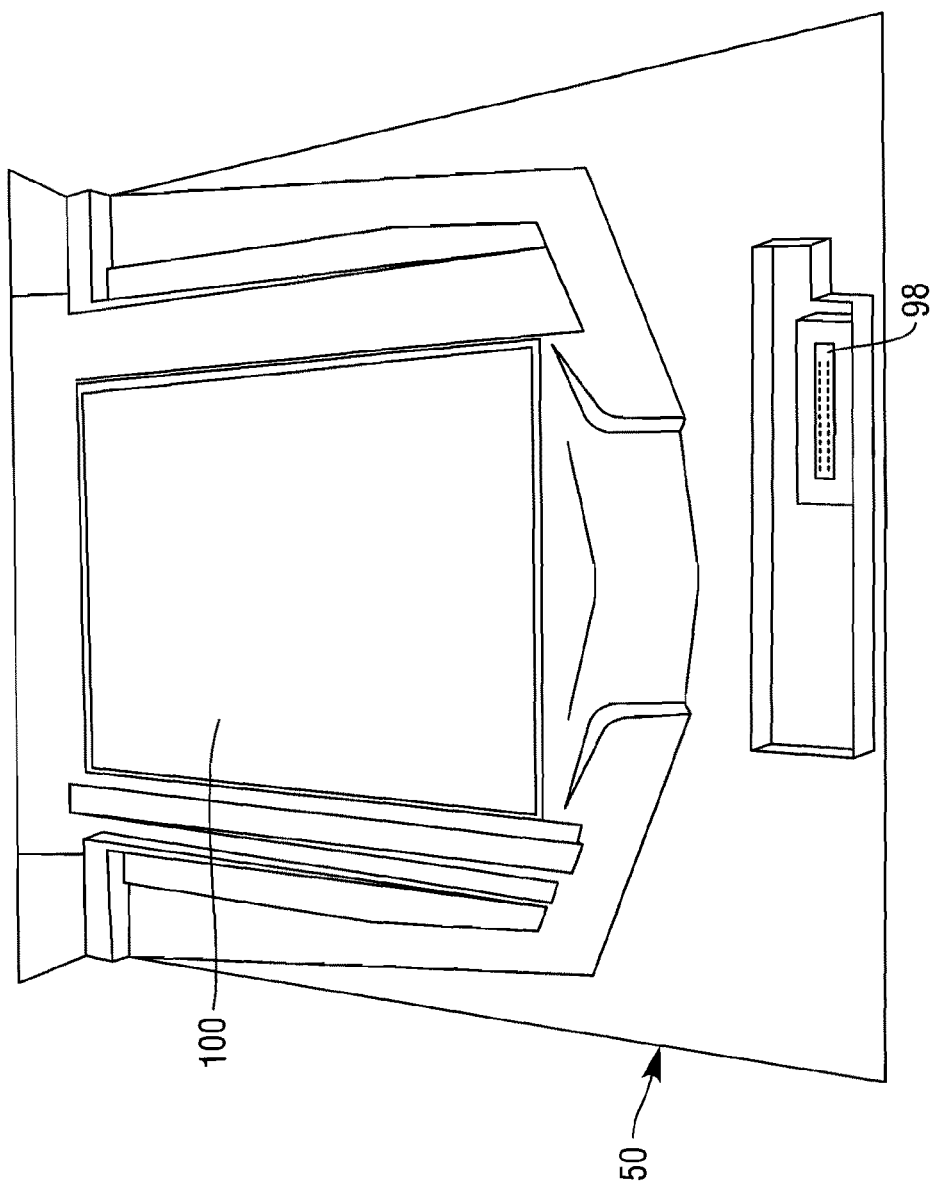
FIG. 4 is a view illustrating a load cell electrical connection.

Load cell support member 64 provides a platform for mounting load cells 36 and load cell electrical circuitry 68. Load cell support member 64 is mounted to screw receptacles 108 in the bottom surface of in top piece 58 (FIG. 5) using one or more screws 118. As illustrated, two screws 118 pass through apertures 86 in load sensing element 80 and apertures 88 in load cell support member 64 (FIG. 4).

Load cell support member 64 may be made of metal and may be generally U-shaped with a left side support member 70, a right side support member 72, and a checker side support member 74. Other support member configurations are also envisioned for other scanners, including four support members around aperture 54.

Load cell support member 64 conveniently borders pattern mirror housing 76 in first housing portion 50 without obstructing scanning light beams from aperture 54 and without interfering with positioning of EAS coil 78 around pattern mirror housing 76. Since scale assembly components are located above pattern mirrors 16, pattern mirror housing 76 may be sealed.

Figure 3:
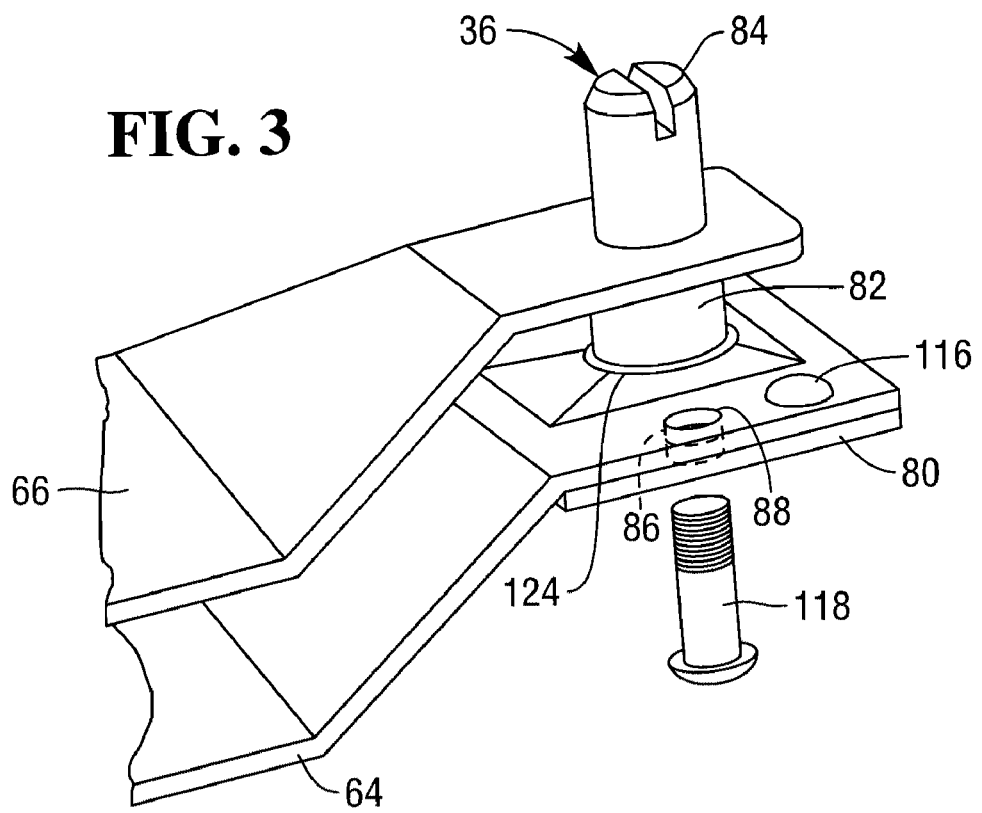
FIG. 3 is a perspective view illustrating a load cell.

Load cells 36 are mounted to load cell support member 64. (FIGS. 2, 3, and 5) Load cells 36 include load sensing element 80 and flexible load mount 82 (FIG. 3).

Load sensing element 80 includes flexible tang 130 (FIG. 5) which senses weight placed on weight plate support post 84. Load sensing element 80 is fastened to load cell support member 64 with screws 116.

Flexible load mount 82 couples to load sensing element 80. Flexible load mount 82 extends through aperture 124 in load cell support member 64.

Weigh plate support post 84 fastens to flexible load mount 82 through an aperture in load cell floating frame 66. Besides supporting weigh plate 60, weigh plate support post 84 couples load cell floating frame 66 to load cell 36. Weight plate support posts 84 protrude through apertures 112 in top piece 58.

Load cell floating frame 66 counteracts side loads and minimizes corresponding spreading of load cells 36. The illustrated example of load cell floating frame 66 is generally U-shaped and is made of metal. Load cell floating frame 66 includes left frame member 90, right frame member 92, and checker side frame member 94. Other support floating frame configurations are also envisioned for other scanners, including four floating frames around aperture 54.

Load cell support member 64 and load sensing element 80 are rigidly mounted to top piece 58. Load cell floating frame 66, flexible load mounts 82, and weight plate support posts 84 are free to move up and down with weigh plate 60.

Electrical circuitry 68 may be affixed to checker side support member 74. Electrical circuitry 68 includes connector 96 which couples to a corresponding connector 98 (FIG. 4) in first housing portion 50. Connector 98 ultimately couples to control circuitry 24 within scanner housing 48.

At one end, top piece 58 may be supported by feet 104. Feet and first housing portion 50 are supported by metal basket 120. At another end, top piece 58 includes latch ends 106 which rotatably couple to corresponding latch receptacles 110. Top piece 58 may also include inner feet 114 which support top piece 58 on pattern mirror housing 76.

Top piece 58 is inserted into latch receptacles 110 and rotated down into position. Electrical connectors 96 and 98 (FIG. 4) are coupled in the process. Removal occurs in an opposite fashion.

Top piece 58 may also include stops 122 which limit lateral movement of scanner 10 within a checkstand opening.

Scale assembly 26 may be serviced by removing top piece 58. There is no need to open pattern mirror housing 76 or otherwise disassemble first housing portion 50 to reach scale assembly components.

Scale assembly mounting apparatus 80 eliminates the need for costly scale components to be located within scanner 10, particularly when scanner 10 is sold without a weighing function. Less skill is required to install or remove scale assembly 26. Other components, such as EAS system 28 may be more easily installed and removed without interference from scale assembly components. Finally, without scale assembly components, pattern mirror housing 76 may be sealed to keep out dust and liquids.

Although particular reference has been made to certain embodiments, variations and modifications are also envisioned within the spirit and scope of the following claims.

What is claimed is:

1. A scale assembly mounting apparatus for a barcode scanner comprising:
   a top surface which surrounds an aperture of a mirror housing of the scanner on at least three sides;
   a bottom surface including a load cell assembly mounting structure for suspending a load cell assembly between the bottom surface and the mirror housing; and
   post apertures through the top and bottom surfaces through which weigh plate support posts extend upwards from below when the load cell assembly is coupled to the load cell assembly mounting structure.

2. A barcode scanner comprising:
   a mirror housing including an aperture;
   a top piece over the mirror housing which surrounds the aperture on at least three sides, and which includes a bottom surface including a load cell assembly mounting structure for suspending a load cell assembly between the bottom surface and the mirror housing; and
   a load cell assembly coupled to the load cell assembly mounting structure including posts for supporting a weigh plate above the top piece, and wherein the top piece comprises post apertures through which the posts extend.

3. The barcode scanner of claim 2, wherein the load cell assembly further comprises:
   a load cell support frame;
   a plurality of load cells coupled to the load cell support frame;
   wherein the load cell support frame is rigidly mounted to the load cell assembly mounting structure;
   a plurality of flexible load mounts on the plurality of load cells;
   a floating frame coupled to the flexible load mounts by the posts.

4. The barcode scanner of claim 2, further comprising:
   a first housing portion including the mirror housing and the top piece and including a substantially horizontal aperture for scanning an item from a first set of directions; and
   a second housing portion coupled to the first housing portion including a substantially vertical aperture for scanning the item from a second set of directions.

5. The barcode scanner of claim 4, wherein the top piece is generally U-shaped.

6. The barcode scanner of claim 5, wherein the second housing portion comprises latch receptacles.

7. The barcode scanner of claim 6, wherein the top piece further comprises latch ends which couple the top piece to the latch receptacles.

8. The barcode scanner of claim 7, wherein the top piece is removable by rotating the top piece upwards about the latch ends to disengage the latch ends from the latch receptacles.

9. A barcode scanner comprising:
   a first housing portion including a mirror housing for scanning an item from a first set of directions;
   a second housing portion coupled to the first housing portion including a substantially vertical aperture for scanning the item from a second set of directions, and including latch receptacles;
   a generally U-shaped top piece over the mirror housing including:
      latch ends for engaging the latch ends, wherein the top piece is removable by rotating the top piece upwards about the latch ends to disengage the latch ends from the latch receptacles;
      a bottom surface including a load cell assembly mounting structure for suspending a load cell assembly between the bottom surface and the mirror housing; and
      post apertures through which weigh plate support posts extend upwards from below when the load cell assembly is coupled to the load cell assembly mounting structure.

10. A barcode scanner comprising:

a first housing portion including a substantially horizontal aperture for scanning an item from a first set of directions and further including a mirror housing including an aperture; and a generally U-shaped top piece over the mirror housing which surrounds the aperture of the mirror housing on at least three sides, and which includes a bottom surface including a load cell assembly mounting structure for suspending a load cell assembly between the bottom surface and the mirror housing; and a second housing portion coupled to the first housing portion including a substantially vertical aperture for scanning the item from a second set of directions and further including latch receptacles.

11. The barcode scanner of claim 10, wherein the top piece further comprises latch ends which couple the top piece to the latch receptacles.

12. The barcode scanner of claim 11, wherein the top piece is removable by rotating the top piece upwards about the latch ends to disengage the latch ends from the latch receptacles.

* * * * *